Dec. 5, 1961   J. J. KOTTE   3,011,393
CINEMATOGRAPH FILM PROJECTOR
Filed Aug. 24, 1959

INVENTOR
jan jacob kotte
BY
AGENT

United States Patent Office 3,011,393
Patented Dec. 5, 1961

3,011,393
CINEMATOGRAPH FILM PROJECTOR
Jan Jacob Kotte, Emmasingel, Eindhoven, Netherlands, assignor to North American Philips Company, Inc., New York, N.Y., a corporation of Delaware
Filed Aug. 24, 1959, Ser. No. 835,799
Claims priority, application Netherlands Sept. 25, 1958
3 Claims. (Cl. 88—17)

This invention relates to cinematograph film (motion picture) projectors provided with a coupling member in the drive between an intermittently driven driving roller or feed sprocket for the film and a continuously driven shutter for periodically intercepting the light beam for the illumination of a film frame. According to this invention a gear wheel is provided as a coupling member, which gear wheel at its circumference is provided with teeth arranged at an angle such that in operation an axial force component is exerted on the gear wheel and resiliently absorbed when the axial force exceeds a given or predetermined value.

This construction of a cinematograph film projector aims at the provision, between the intermittent drive of the driving roller and the continuous drive of the shutter, of a mechanical filter so that the shocks produced by the intermittent drive of the driving roller are prevented from propagating through the entire drive mechanism. The presence of such a filter ensures that the film projector runs more reliably and quietly for extended periods of time.

In a presently known film projector of the kind to which the present invention relates, the gear-wheel, serving as the coupling member, is capable of axially sliding along its shaft against spring action. In this construction, the mounting of the gear-wheel on its shaft obviously has to satisfy exacting requirements.

According to the invention, the gear wheel is rigidly mounted on its shaft and contains, between the hub and the toothed rim, a portion of such resilience that an axial force of 30 kgs. produces a deflection of at least 1 mm.

The invention provides the advantage that no additional component parts are required so that the driving mechanism of this invention is less complicated and less expensive. Furthermore, the operation of the mechanical filter disclosed hereby is more reliable since it cannot be impeded by sliding friction.

According to a further feature of the invention, the gear-wheel is made in one piece, the part intermediate the hub and the toothed rim having a modulus of elasticity of less than 500,000 kgs./square cm.

Preferably the gear-wheel is made from synthetic resin reinforced by textile fibres.

In order that the invention may readily be carried into effect, an embodiment thereof will now be particularly described, by way of example, with reference to the accompanying diagrammatic drawings, in which—

Figure 1:
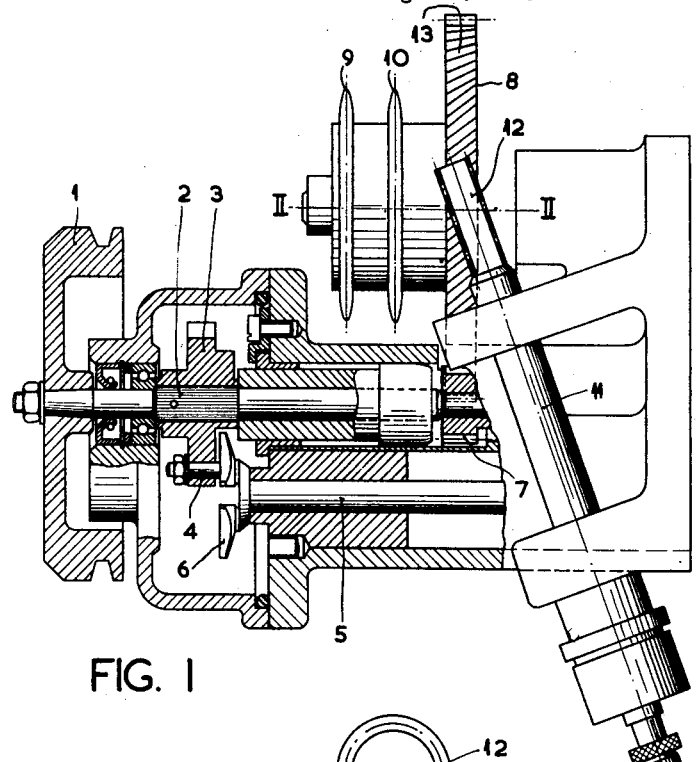
Figure 2:
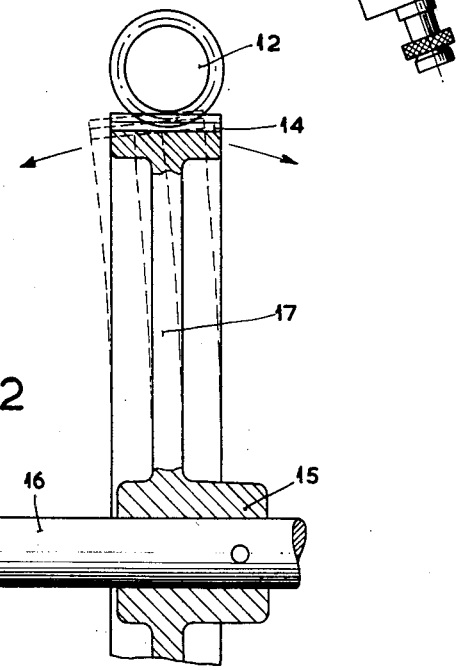

FIG. 1 is a plan view of that portion of the drive of a motion picture projector to which the invention relates, and FIG. 2 is a partial sectional view of the resilient coupling of the invention in which the reference numerals of FIG. 1 show corresponding parts.

In the figures, a pulley 1 is driven by a driving motor (not shown). A driving shaft 2 provided with a driving disc 3 and a driving pin 4 is rigidly coupled to the pulley 1. On a driven shaft 5 there is mounted a Maltese cross 6 for driving a film sprocket (not shown) which is mounted at the other end of the shaft 5. A gear-wheel 7 is mounted on the shaft 2 and drives a gear wheel 8. Chain-wheels 9 and 10 are rigidly coupled to the shaft of gear-wheel 8 and drive the remainder of the film projector elements. A shutter shaft 11 is provided at one end 12 with teeth which co-operate with oblique teeth 13 of the gear-wheel 8. The gear-wheel 8, shown separately in FIG. 2, comprises a toothed rim 14 joined to a hub 15 rigidly mounted on a shaft 16 by a resilient part or spider 17. The toothed rim 14 can be deflected axially, in the manner shown by broken lines in FIG. 2, by shock loads or an abrupt increase of the forces to be transmitted.

What is claimed is:

1. A cinematograph film projector provided with an intermittently driven sprocket for the film and a continuously driven shutter for periodically intercepting the light beams for the illumination of a film frame, and in which in the drive between the sprocket and the shutter a gear-wheel is provided as a coupling member which at its circumference is provided with teeth arranged at an angle such that in operation, an axial force is exerted on the rim, said coupling member characterized by means to mount said gear-wheel rigidly on its shaft, a spider portion, between the hub and toothed rim, of an elasticity such that an axial force of 30 kgs. produces a deflection of at least 1 mm.

2. A cinematograph film projector as claimed in claim 1, characterized in that the gear-wheel is made in one piece, the spider portion joining the hub and the toothed rim having a modulus of elasticity of less than 500,000 kgs./sq. cm.

3. A cinematograph film projector as claimed in claim 2, characterized in that the gear-wheel is made of textile-reinforced synthetic resin.

References Cited in the file of this patent
UNITED STATES PATENTS

| | | |
|---|---|---|
| 2,754,721 | Grass | July 17, 1956 |
| 2,802,392 | Kingston | Aug. 13, 1957 |
| 2,807,188 | Badgley | Sept. 24, 1957 |